United States Patent [19]
Ritchie et al.

[11] 3,832,831
[45] Sept. 3, 1974

[54] COOLER-FILTER UNIT FOR COMPRESSED AIR SYSTEMS

[75] Inventors: Rex E. Ritchie; John B. Welker, both of Van Wert, Ohio

[73] Assignee: Aeroquip Corporation, Jackson, Mich.

[22] Filed: Aug. 10, 1972

[21] Appl. No.: 279,488

[52] U.S. Cl.......................... 55/218, 55/309, 55/316
[51] Int. Cl............................................ B01d 50/00
[58] Field of Search ............................ 55/210–213, 55/218, 219, 267, 302, 309, 314, 316, 387, 388

[56] References Cited
UNITED STATES PATENTS

| | | | |
|---|---|---|---|
| 3,093,467 | 6/1963 | McLaughlin .......................... | 55/218 |
| 3,261,146 | 7/1966 | Malec .................... | 55/218 |
| 3,426,508 | 2/1969 | McGrath............................. | 55/210 |
| 3,464,186 | 9/1969 | Hankison et al...................... | 55/316 |
| 3,516,231 | 6/1970 | George ................................ | 55/267 |
| 3,592,563 | 7/1971 | Glass et al. ........................... | 55/302 |

FOREIGN PATENTS OR APPLICATIONS
225,654  5/1969  U.S.S.R................................ 55/218

*Primary Examiner*—Bernard Nozick
*Attorney, Agent, or Firm*—Harness, Dickey & Pierce

[57] ABSTRACT

A cooler-filter unit connected between a governor-controlled compressor and an air tank. The unit directs compressor air along the inside surface of a metal housing for cooling, moisture being trapped in a sump. The air reverses flow to separate particles and passes through an annular filter and desiccant bed to the outlet. A water dump valve responsive to governor signals is located within the housing so that the warm circulating air will prevent its freezing. The filter and desiccant are carried by a separate housing and should the filter become clogged, air pressure will shift this housing to bypass the air directly to the outlet. In the event of governor failure to stop the compressor, high pressure will open the water dump valve which will act as a pop-off valve.

7 Claims, 2 Drawing Figures

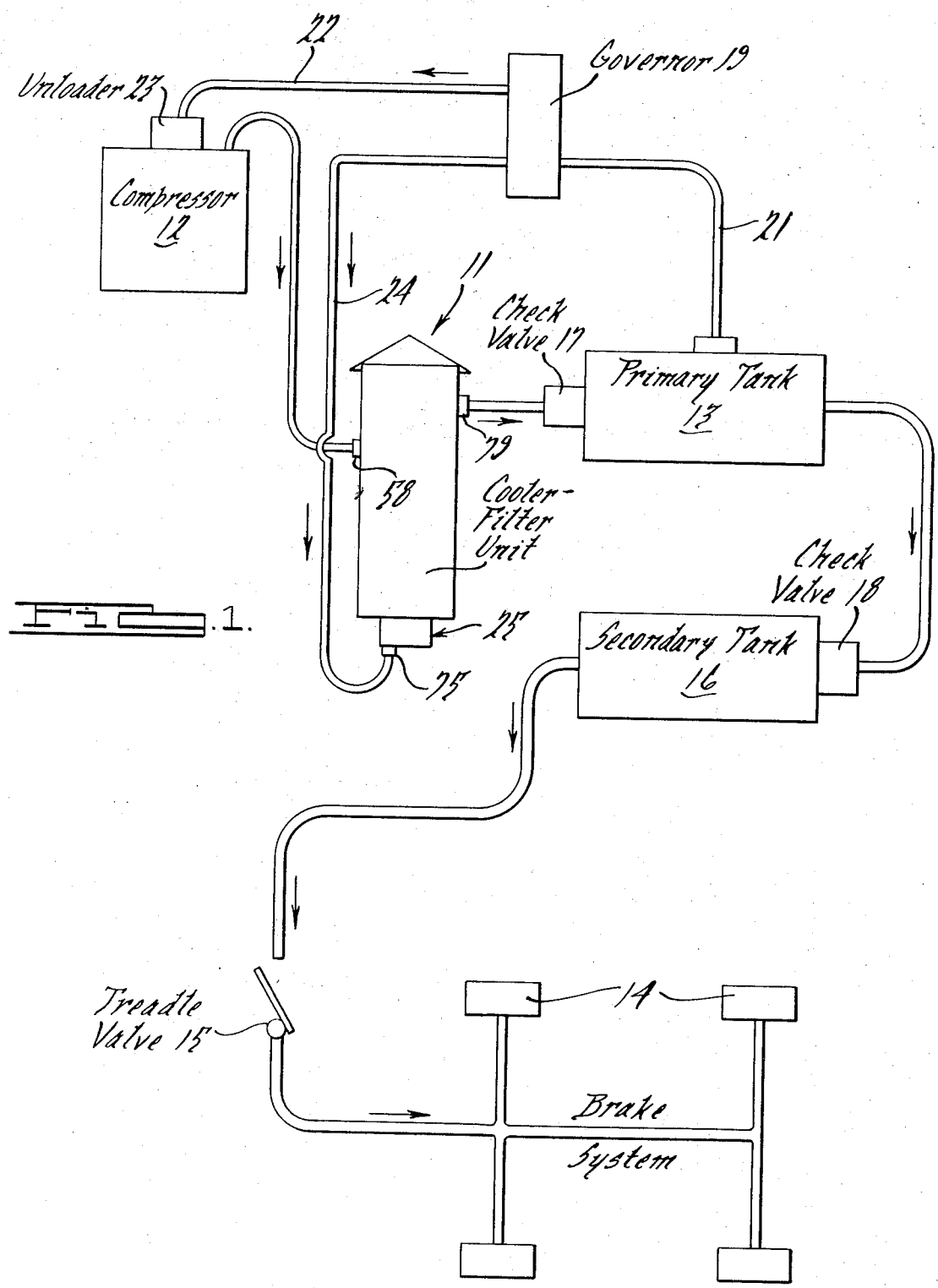

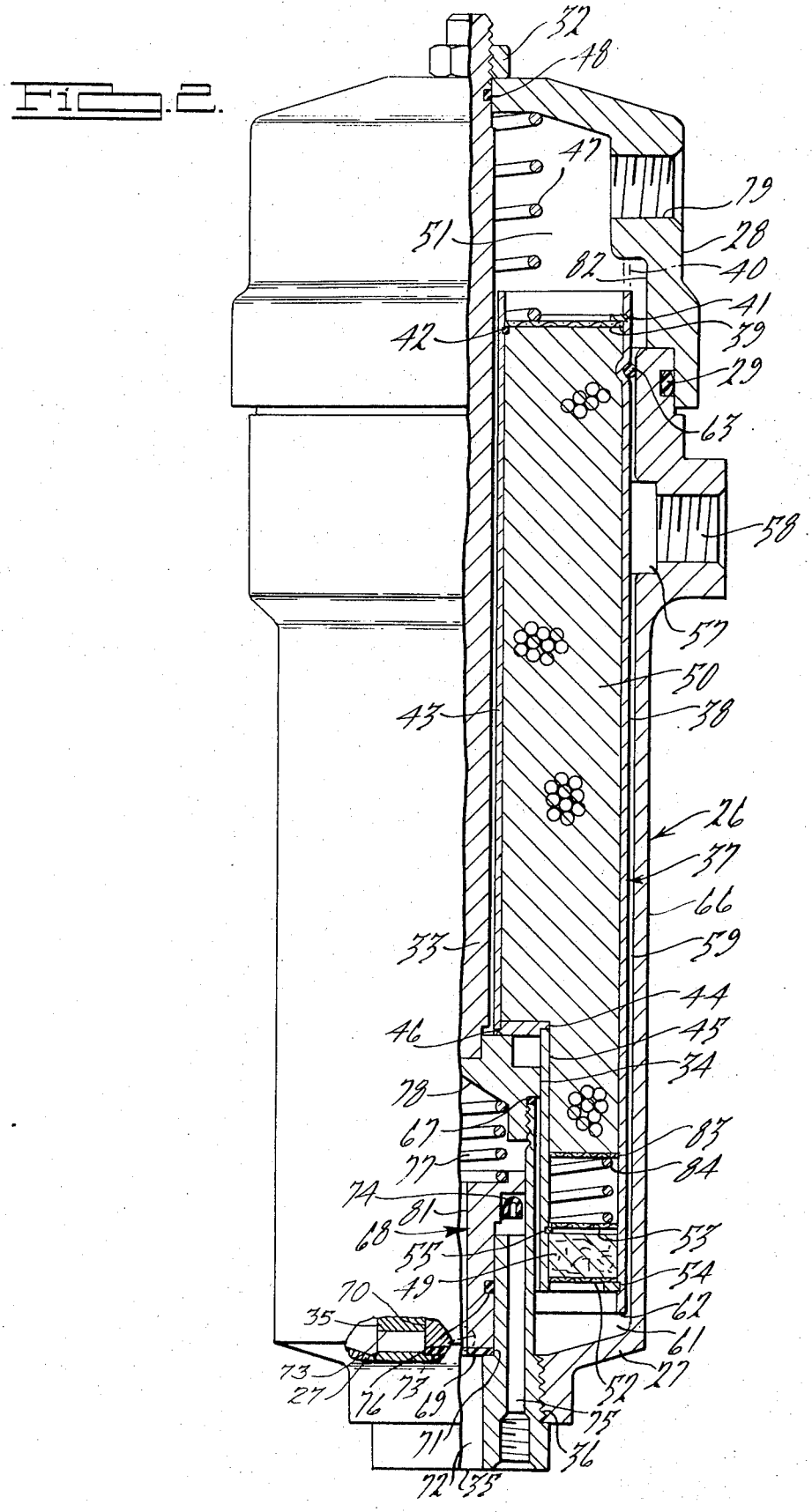

3,832,831

COOLER-FILTER UNIT FOR COMPRESSED AIR SYSTEMS

BACKGROUND OF THE INVENTION

1. Field of the Invention

The invention relates to compressed air systems, particularly those used on vehicles with air brakes and other accessories operated by compressed air. Such systems have one or more compressed air tanks supplied by a compressor, a governor being interposed between the first tank and an unloader which controls the compressor. To remove moisture, oil and entrained particles from the compressed air, it is known to provide cooling and filter units between the compressor and the first tank. These units collect moisture and are controlled by a signal from the governor to dump the collected moisture periodically when the compressor is inactive. The invention is particularly concerned with such cooling and filter units.

2. Description of the Prior Art

A system of the general type described is shown in McGrath U.S. Pat. No. 3,426,508, and another form of cooling and filtering unit is shown in George U.S. Pat. No. 2,840,183. However, as will later appear, prior devices of this type have certain deficiencies which it is a general object of the present invention to overcome.

BRIEF SUMMARY OF THE INVENTION

It is an object of the invention to provide a novel and improved cooler-filter unit which utilizes the flow path of the compressed air to a maximum extent both for cooling and filtering, thus resulting in an extremely compact and economical unit.

It is a further object to provide a unit of this nature which insures flow from the compressor to the tank even when the filter is clogged, and also includes means for "popping off" the compressor discharge to the atmosphere should the governor fail to control its operation.

It is another object to provide an improved unit of this character in which the water dump valve is protected against malfunction due to freezing temperatures.

Briefly, the illustrated embodiment of the invention comprises a combined cooler-filter unit having an outer metal shell, an inner filter-desiccant housing, the air from the compressor flowing between these housings and being cooled during flow along the inner surface of the outer shell, the inner housing being axially shiftable in response to a rise in pressure caused by clogging of the filter to bypass the air directly to the outlet, a sump enclosed within the outer shell, and a signal-pressure responsive water dump valve also within the outer shell, whereby the warm air flowing through the unit will prevent freezing of the dump valve. The invention further comprises a smaller piston area carried by the dump valve so that this valve will be responsive to high pressures caused by an uncontrolled compressor to shift to a "pop-off" position.

BRIEF DESCRIPTION OF THE DRAWINGS

FIG. 1 is a diagrammatic view of a compressed air system utilizing the cooler-filter unit of this invention; and FIG. 2 is a cross-sectional view in elevation of the cooler-filter unit.

DESCRIPTION OF THE PREFERRED EMBODIMENT

The cooler-filter unit of this invention is generally indicated at 11 and is installed between the compressor 12 and primary compressed air tank 13 of a compressed air system such as one used for a vehicle air brake system having brakes 14 controlled by a treadle valve 15. Such a system may have a secondary tank 16 in series with the primary tank, with a check valve 17 disposed between unit 11 and the primary tank and a check valve 18 between the primary and secondary tanks. A governor 19 controlled by a signal line 21 from the primary tank has a conduit 22 leading to an unloader 23 on compressor 12. When the air pressure in tank 13 reaches a predetermined low level, governor 19 will act on unloader 23 in such a way as to cause compressor 12 to be activated. This will cause compressed air to flow from the compressor through cooler-filter unit 11 to primary tank 13 and secondary tank 16. When the pressure in primary tank 13 reaches a predetermined high level, governor 19 will cause unloader 23 to disenable compressor 12. At the same time, a pressure signal from governor 19 through a signal line 24 will activate a dump valve generally indicated at 25 at the bottom of unit 11. This will permit moisture which has been collected in unit 11 to drain out. As soon as the compressor 12 is started again by governor 19, the pressure signal in line 24 will cease, and dump valve 25 will close. Compressor 12 may thus again supply tank 13.

The construction of unit 11 is shown in FIG. 2. The unit comprises an outer cylindrical shell generally indicated at 26 fabricated of a heat-conductive metal. A bottom 27 is formed on the lower end of this housing and an upper cap 28 is removably mounted thereon, the housing having an outwardly facing groove with a seal 29 engaging the cap. Cap 28 is held down by a self-locking nut 32. This nut is threaded on a hexagonal rod 33 extending upwardly through cap 28. A member 34 is secured to the lower end of rod 33 and has a lower threaded portion which carries an annular member 35. This member is threaded into bottom 27 at 36 and extends upwardly through the bottom.

A filter-desiccant housing generally indicated at 37 is disposed within shell. Housing has an annular outer member 38 which is somewhat shorter than shell 26. A perforated screen 39 is secured with a retaining ring 41 to the upper end of member 38 and with a retaining ring 42 to an annular inner housing member 43 closely surrounding rod 33. An annular member 44 is secured to the lower end of member 43 and extends outwardly therefrom, and a cylindrical member 45 extends downwardly from the outer edge of member 44. The latter member rests on a shoulder 46 of member 34 and is urged thereagainst by a helical coil compression spring 47 disposed between screen 39 and cap 28. As will be later seen, sufficient upward pressure on housing 37 will cause spring 47 to compress, the housing moving upwardly. A seal 48 is provided between cap 28 and rod 33. The structure is such that the upward movement of housing 37 will be limited to the position shown in dot-dash lines 40.

Housing 37 carries an annular filter 49 at its lower end and a major portion of its volume contains a granular desiccant bed 50. The filter may be fabricated of any suitable material such as certain plastic materials which trap oil in compressed air systems. The filter will also be capable of trapping flakes of carbon and other foreign particles, particularly those of lighter weight which will not drop out before the filter is reached. A chamber 51 exists above housing 37 and screen 39. A pair of screens 52 and 53 are provided for retaining filter 49, screen 52 being held in place by a snap ring 54 and screen 53 by a snap ring 55. Screens 53 and 83 secure a helical compression spring 84 which supplies a constant spring load on the desiccant bed 50. During normal operation, air will flow upwardly through filter 49 and desiccant 50 to chamber 51 above upper screen 39. The desiccant may be of a suitable beaded type that does not break up and become powderized during operation. This material will be held in place by screen 83 and upper screen 39. It will be noted that the entire housing 37 may be removed and replaced by first removing cap 28 and spring 47.

Outer shell 26 is provided with an annular recess 57 at the inlet port area 58, leading from compressor 12. The annular space 59 between member 38 and shell 26 has an area greater than that of inlet port 58. The air will flow from recess 57 downwardly through space 59 into a sump chamber 61 as it reverses flow around the lower edge 62 of member 38, this edge being disposed below filter 49. A seal 63 carried by member 38 above inlet port 58 engages cap 28 and prevents upward flow of the compressed air. Seal 63 is held by a groove in member 38.

A dump valve generally indicated at 68 slidably mounted in member 35. This valve is of annular shape and its lower end 69 is engageable with a shoulder 71 at the upper end of a central water dump passage 72 leading downwardly through member 35. A plurality of radial passages 73 extend inwardly through annular member 35 from sump chamber 61 to the space indicated at 70 above shoulder 71 between member 35 and valve 68. This valve has a U-cup seal 74 exposed to pressure from a signal port 75 in member 35 connected to governor 19. A seal 76 carried by valve 68 above radial passages 73 engages the interior of member 35 and prevents escape of the signal pressure. A helical coil compression spring 77 is disposed between the top of valve 68 and the bottom of a recess 78 in fixed member 34. Spring 77 urges the bottom 69 of valve 68 against shoulder 71 but may be counteracted by signal pressure from port 75 acting on U-cup real 74, to lift valve 68 and permit drainage of water in sump 61 through ports 73. It will be observed that the area of seal 76 is exposed to pressure in sump chamber 61 through radial passages 73, this area, however, being substantially less than that of piston 74.

In operation, the parts will normally have the positions shown in FIG. 2 when compressor 12 is running, and compressed air will flow from the compressor into inlet port 58, through unit 11 and will exit through an outlet port 79 in cap 28, the outlet port being adjacent the upper end of the unit and leading from chamber 51 to primary tank 13. More particularly, the air entering port 58 will pass downwardly through passage 59, flowing along the interior of metal shell portion 66 and thus being cooled to condense water vapor entrained therein. The water collected in annular space 59 will drain down into sump chamber 61.

As the air passes lower lip 62 of housing member 38, it will reverse its flow and, because of the increased area, decrease its velocity. This flow reversal and velocity change will separate foreign matter entrained in the air which will fall into sump chamber 61. The air will then flow through filter 49 which will entrap oil, carbon flakes and other entrained lightweight particles. The air will continue to flow upwardly to desiccant 50 which will remove more moisture, and will flow upwardly through screen 39 to chamber 51 and through outlet 79.

When compressor 12 stops pumping compressed air to inlet 58 upon a signal from governor 19, the governor will also supply a pressure signal to port 75. This will lift valve 68 so that its end 69 will be lifted above radial passages 73. As a result, water and foreign matter may be expelled (blown out) from sump 61 through passages 73 to port 72. Upon restarting of compressor 12 the pressure signal at port 75 will be removed and valve 68 will again be closed.

It has been found that when the ambient temperature ranges between about 28° and 30° F. water collecting in a sump chamber of a compressed air system filter is apt to freeze in such a way that the dump valve will not properly operate to evacuate the water. In accordance with the invention, this critical problem is alleviated by locating both the sump chamber 61 and dump valve 68 within shell 26 in such a manner that the warm air flowing through chamber 61 around members 35 and 68 will prevent freezing of the water and valve.

Operation of valve 68 will be further insured by the fact that the top of seal 74 is sealed against the compressed air pressure by seal 67 and is also vented through a passage 81 to drain passage 72. During the dumping portion of the cycle, all the compressed air from check valve 17 back through unit 11 and also from compressor 12 through the unit will blow out through dump port 72 to the atmosphere. Thus, all impurities will be discharged and the desiccant 63 will be regenerated and filter 49 will be backflushed to remove collected moisture, oil, carbon and other particles.

Should filter 49 become clogged due to the accumulation of foreign matter such as carbon particles or due to water frozen in the filter which forms a blockage to the point where insufficient air flow is permitted to outlet 79, this will result in an increased upward force being exerted on the entire assembly within housing 37. This force will counteract spring 47 and the housing will move upwardly to the dot-dash line position 40 of FIG. 2. When in this position, seal 63 will be past the seal area of the shell 26 and opposite an annular recess 82 in cap 28 of shell 26, so that air from inlet port 58 will flow upwardly around seal 63 and through space 59 to chamber 51, where it will exit through outlet port 79. Thus, the air will bypass filter 49 and desiccant 50, and sufficient pressure will continue to be supplied to tanks 13 and 16 for operation of the compressed air system.

A situation may arise where governor 19 fails to cause unloader 23 to shut off compressor 12 at the proper time. This could happen for example upon a blockage at check valve 17 which results in failure of pressure buildup at primary tank 13. In such an event, the increased pressure will act upon seal 76 and when it reaches a predetermined value will lift valve 68, so that the pressure from compressor 12 may be released to the atmosphere through ports 73 and 72. This pop-off action will take place at a much higher unit pressure than that which activates valve 68 from signal port 75. For example, in a typical installation a pressure at of about 50 p.s.i. at signal port 75 will operate valve 68, whereas a pressure of about 350 p.s.i. on seal 76 will cause the pop-off action to take place.

We claim:

1. In a filter unit for compressed air systems, a shell, a compressed air inlet port on an intermediate portion of said shell, an annular filter including an outer housing within said shell and spaced radially inwardly of said inlet port, a sump chamber in said shell below said filter, means guiding air from said inlet port downwardly along an annular path between said shell and filter and then upwardly through said filter, whereby moisture and entrained particles carried downwardly by said air will be collected in said chamber, an outlet port in said shell above said filter for the compressed air leaving said filter, dump valve means centrally located within said sump chamber and comprising an annular member extending upwardly from the bottom of said shell, said member being centrally located within said sump chamber and having a dump port with an annular shoulder thereabove at the level of said sump chamber, the shoulder constituting a valve seat, a dump valve slidable in said annular member and having a lower surface engageable with said seat, the annular member conducting heat from the relatively warm compressed air flowing through said sump chamber to said valve and seat, radial passageway means in said annular member leading from said sump chamber above said seat, a spring positioned between a wall and said dump valve urging said dump valve downwardly, and means positioned adjacent a surface on the dump valve responsive to and communicating with signal pressure to lift said dump valve off said seat against the urging of said spring and drain said sump chamber through said dump port.

2. The combination according to claim 1, said signal-pressure responsive means comprising a piston of predetermined area on said valve, and a seal on said valve above said radial passageway means.

3. The combination according to claim 1, said air guiding means leading from said inlet port comprising an annular housing disposed within said shell and carrying said filter and a desiccant, said compressed air entering said inlet port passing between said shell and housing, a seal and annular recess on said shell and housing, resilient means urging said housing downwardly to a normal position, the housing being responsive to pressure formed thereunder by a clogged filter to lift against said last-mentioned resilient means until said seal and recess are opposite each other, whereby air entering said inlet port will be bypassed around said filter and desiccant to said outlet port.

4. The combination according to claim 3, said signal-pressure responsive means comprising a piston of predetermined area on said valve, and a seal on said valve above said radial passageway means.

5. The combination according to claim 3, said seal being carried by said housing between said inlet and outlet ports, said annular recess being formed in said shell.

6. In a cooler-filter unit for compressed air systems, an outer metal shell, an annular housing defined by inner and outer surfaces within said shell carrying a filter at its lower end and a desiccant thereabove, a compressed air inlet port in said shell and a compressed air outlet port thereabove, said ports being outwardly of said housing, the housing and shell forming an annular space whereby compressed air will flow downwardly therethrough and be cooled by said metal shell, a sump chamber at the bottom of said shell, means causing said air to reverse its flow at said sump chamber and flow upwardly through said filter and desiccant to an upper chamber thereabove, said outlet port being connected to the upper chamber, an upper spring positioned between the top of the shell and filter and a lower shoulder supporting a lower portion of the housing holding said housing in a lower normal position, and an annular recess and a seal on said housing and shell, the housing being responsive to upward pressure caused by a clogged filter to counteract said spring and be lifted until said recess and seal are opposite each other, whereby air from said inlet port will be bypassed around the filter and desiccant through said upper chamber to said outlet port.

7. The combination according to claim 6, further provided with a rod supported at its upper end by a cap on said shell and supporting said shoulder at its lower end, said cap being removable whereby said housing may be withdrawn to replace the filter and desiccant.

* * * * *